US012277563B2

(12) United States Patent
Yajima et al.

(10) Patent No.: US 12,277,563 B2
(45) Date of Patent: Apr. 15, 2025

(54) SELF-SERVICE COMMODITY SALES DATA PROCESSING DEVICE AND METHOD THEREOF

(71) Applicant: TOSHIBA TEC KABUSHIKI KAISHA, Tokyo (JP)

(72) Inventors: Shinsuke Yajima, Mishima Shizuoka (JP); Hidehiro Naito, Mishima Shizuoka (JP); Masaki Ito, Numazu Shizuoka (JP); Yuki Kawaguchi, Tagata Shizuoka (JP); Takahiro Saitou, Izunokuni Shizuoka (JP); Atsushi Miyashima, Izunokuni Shizuoka (JP); Toshihiro Kaneko, Izunokuni Shizuoka (JP); Taiki Tanihira, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 545 days.

(21) Appl. No.: 17/552,366

(22) Filed: Dec. 16, 2021

(65) Prior Publication Data

US 2022/0277309 A1 Sep. 1, 2022

(30) Foreign Application Priority Data

Mar. 1, 2021 (JP) ................................. 2021-031409

(51) Int. Cl.
*G06Q 20/40* (2012.01)
*G06Q 20/20* (2012.01)
(Continued)

(52) U.S. Cl.
CPC ....... *G06Q 20/4016* (2013.01); *G06Q 20/208* (2013.01); *G06V 20/52* (2022.01);
(Continued)

(58) Field of Classification Search
None
See application file for complete search history.

(56) References Cited

U.S. PATENT DOCUMENTS 9,406,059 B1 * 8/2016 White ................. G06Q 20/208
10,282,720 B1 * 5/2019 Buibas ................. G06Q 20/40
(Continued)

FOREIGN PATENT DOCUMENTS

| WO | WO-2013033442 A1 * | 3/2013 | .......... G06Q 20/208 |
| WO | WO-2019062017 A1 * | 4/2019 | .......... G06Q 20/208 |
| WO | WO-2021108033 A1 * | 6/2021 | ............ G06V 20/52 |

OTHER PUBLICATIONS

Bobbit et al., "Visual item verification for fraud prevention in retail self-checkout," 2011 IEEE Workshop on Applications of Computer Vision (WACV), Kona, HI, USA, 2011, pp. 585-590, doi: 10.1109/WACV.2011.5711557. (Year: 2011).*
(Continued)

*Primary Examiner* — Eduardo Castilho
(74) *Attorney, Agent, or Firm* — Amin, Turocy & Watson, LLP (57) ABSTRACT

A self-service commodity sales data processing device that includes a take-out determination unit for determining whether commodities were taken out simultaneously based on an image of a commodity taken out, a first identical termination unit for determining whether taken-out commodities are different commodities or identical commodities if the take-out determination unit determines that the commodities are taken out simultaneously, a reading unit for reading information of the taken-out commodities, a second identical determination unit for determining whether the commodities read by the reading unit are the identical commodity if the first identical determination unit determines that the taken-out commodities are different commodities, and a suspension unit for suspending the transac-
(Continued)

tion if the second identical determination unit determines that the commodities are the identical commodity.

16 Claims, 5 Drawing Sheets

(51) Int. Cl.
*G06V 20/52* (2022.01)
*G07G 1/00* (2006.01)

(52) U.S. Cl.
CPC ......... *G07G 1/0018* (2013.01); *G07G 1/0045* (2013.01); *G06Q 2220/00* (2013.01)

(56) References Cited

U.S. PATENT DOCUMENTS

| | | | |
|---|---|---|---|
| 2008/0027817 A1 | 1/2008 | Iizaka et al. | |
| 2009/0039164 A1* | 2/2009 | Herwig | G07G 1/14 235/462.41 |
| 2009/0272801 A1* | 11/2009 | Connell, II | G06Q 10/087 235/383 |
| 2010/0059589 A1* | 3/2010 | Goncalves | G07G 1/0054 382/218 |
| 2010/0114623 A1* | 5/2010 | Bobbitt | G06Q 20/4016 705/16 |
| 2012/0027297 A1* | 2/2012 | Feris | G06T 7/11 382/173 |
| 2012/0093370 A1* | 4/2012 | Ding | G06F 18/22 382/106 |
| 2015/0193780 A1* | 7/2015 | Migdal | G06Q 30/018 705/317 |
| 2016/0292661 A1* | 10/2016 | Kwan | G06V 20/52 |
| 2018/0218350 A1* | 8/2018 | Crooks | G06Q 20/208 |
| 2018/0232796 A1* | 8/2018 | Glaser | G06Q 30/0641 |
| 2019/0258870 A1* | 8/2019 | Kundu | G06Q 20/4016 |
| 2019/0311346 A1* | 10/2019 | Costello | G06Q 20/4016 |
| 2019/0354770 A1* | 11/2019 | Darvish | G06Q 20/206 |
| 2020/0410825 A1* | 12/2020 | Birnie | G06Q 20/18 |
| 2021/0183212 A1* | 6/2021 | Wen | G06Q 20/208 |
| 2021/0295078 A1* | 9/2021 | Barkan | G06F 18/251 |
| 2021/0342770 A1* | 11/2021 | Li | G06Q 20/208 |
| 2021/0407124 A1* | 12/2021 | Hinek | G06Q 20/18 |
| 2022/0067568 A1* | 3/2022 | Hemmatiyan | G06F 16/56 |
| 2022/0171972 A1* | 6/2022 | Stankovic | G06V 20/52 |
| 2024/0087427 A1* | 3/2024 | Ikezawa | G06Q 20/208 |

OTHER PUBLICATIONS

Wei, X. S., et al. "RPC: A large-scale retail product checkout dataset" arXiv, 2019, arXiv preprint arXiv:1901.07249. (Year: 2019).*

Wu et al., "An intelligent self-checkout system for smart retail," 2016 International Conference on System Science and Engineering (ICSSE), Puli, Taiwan, 2016, pp. 1-4, doi: 10.1109/ICSSE.2016. 7551621 (Year: 2016).*

J. Xu et al., "Design of Smart Unstaffed Retail Shop Based on IoT and Artificial Intelligence," in IEEE Access, vol. 8, pp. 147728-147737, 2020, doi: 10.1109/ACCESS.2020.3014047. (Year: 2020).*

S. R. Subudhi and R. N. Ponnalagu, "An Intelligent Shopping Cart with Automatic Product Detection and Secure Payment System," 2019 IEEE 16th India Council International Conference (INDICON), Rajkot, India, 2019, pp. 1-4, doi: 10.1109/INDICON47234.2019. 9030331. (Year: 2019).*

F. Doshi, J. Tudiya, K. Bafna and K. Ghag, "Fraud Detection System in Self-Checkout Centres," 2021 4th Biennial International Conference on Nascent Technologies in Engineering (ICNTE), NaviMumbai, India, 2021, pp. 1-6, doi: 10.1109/ICNTE51185.2021. 9487671. (Year: 2021).*

H. Y. Putra, "Fraud Detection at Self Checkout Retail using Data Mining," 2020 International Conference on Information Technology Systems and Innovation (ICITSI), Bandung, Indonesia, 2020, pp. 211-216, doi: 10.1109/ICITSI50517.2020.9264919. (Year: 2020).*

Q. Fan et al., "Fast detection of retail fraud using polar touch buttons," 2009 IEEE International Conference on Multimedia and Expo , New York, NY, USA, 2009, pp. 1266-1269, doi: 10.1109/ ICME.2009.5202732. (Year: 2009).*

Fan et al., "Detecting sweethearting in retail surveillance videos," 2009 IEEE International Conference on Acoustics, Speech and Signal Processing, Taipei, Taiwan, 2009, pp. 1449-1452, doi: 10.1109/ ICASSP.2009.4959867. (Year: 2009).*

Machine translation of WO 2019/062017 A1, retrieved from https:// worldwide.espacenet.com/patent/search/family/062775868/publication/ WO2019062017A1 (Year: 2019).*

* cited by examiner

SELF-SERVICE COMMODITY SALES DATA PROCESSING DEVICE AND METHOD THEREOF

CROSS-REFERENCE TO RELATED APPLICATION

This application is based upon and claims the benefit of priority from Japanese Patent Application No. 2021-031409, filed on Mar. 1, 2021, the entire contents of which are incorporated herein by reference.

FIELD

Embodiments described herein relate generally to a self-service commodity sales data processing device and a method thereof.

BACKGROUND

When selling commodities at stores such as supermarkets, mass retailers, and convenience stores, self-service commodity sales data processing devices (for example, self-service point of sales (POS) terminal) that perform commodity registration process and settlement process by the customer's own operation may be used. In such a self-service commodity sales data processing device, a scanner is installed that allows the customer to take out the commodity from the basket and read a symbol such as a barcode. The customer packs the commodity whose symbol is read by the scanner into a shopping bag set in the bag packing unit.

However, in such a self-service commodity sales data processing device, fraudulent acts by customers may be performed. For example, there may be a fraudulent act of taking out a plurality of commodities (for example, two commodities) from a basket at the same time, reading the symbol attached to one commodity (for example, a commodity with a low price) twice, and performing a commodity registration operation for the two commodities, but it has been difficult to prevent such a fraudulent act.

DETAILED DESCRIPTION

Embodiments provide a self-service commodity sales data processing device and a method thereof capable of preventing fraudulent acts related to commodity registration by customers.

In general, according to one embodiment, the self-service commodity sales data processing device is a self-service commodity sales data processing device, in which a customer themselves operates to perform a transaction of a commodity to be purchased, and includes a take-out determination unit for determining whether a plurality of commodities were taken out at the same time based on the image of the commodity taken out from a commodity placing unit, a first identical determination unit for determining whether a plurality of taken-out commodities are different commodities or identical commodities if the take-out determination unit determines that the plurality of commodities are taken out at the same time, a reading unit for reading the information of the taken-out commodities, a second identical determination unit for determining whether the plurality of commodities read by the reading unit are the identical commodity if the first identical determination unit determines that the taken-out commodities are different commodities, and a suspension unit for suspending the transaction if the second identical determination unit determines that the commodities are the identical commodity.

Hereinafter, an embodiment will be described with reference to the drawings. In the embodiment, a self-service type POS terminal (hereinafter referred to as "self-service POS terminal") that the customer operates by themselves will be described as an example of the self-type commodity sales data processing device. The present disclosure is not limited to the embodiment described below.

The self-service POS terminal according to the embodiment is installed in the area where the payment is made at the store. The store displays the commodities that the customer purchases. A symbol is attached to the commodity or a container (bag, box, or the like) where the commodity is placed. The symbol is coded information and includes information for identifying the attached commodity. The customer receives the basket when entering the store and puts the commodity to be purchased in the basket.

The self-service POS terminal is a device in which the customer themselves operates a commodity registration operation for causing a scanner to read a symbol attached to the commodity to be purchased and a settlement operation for paying the price for the commodity.

Figure 1:
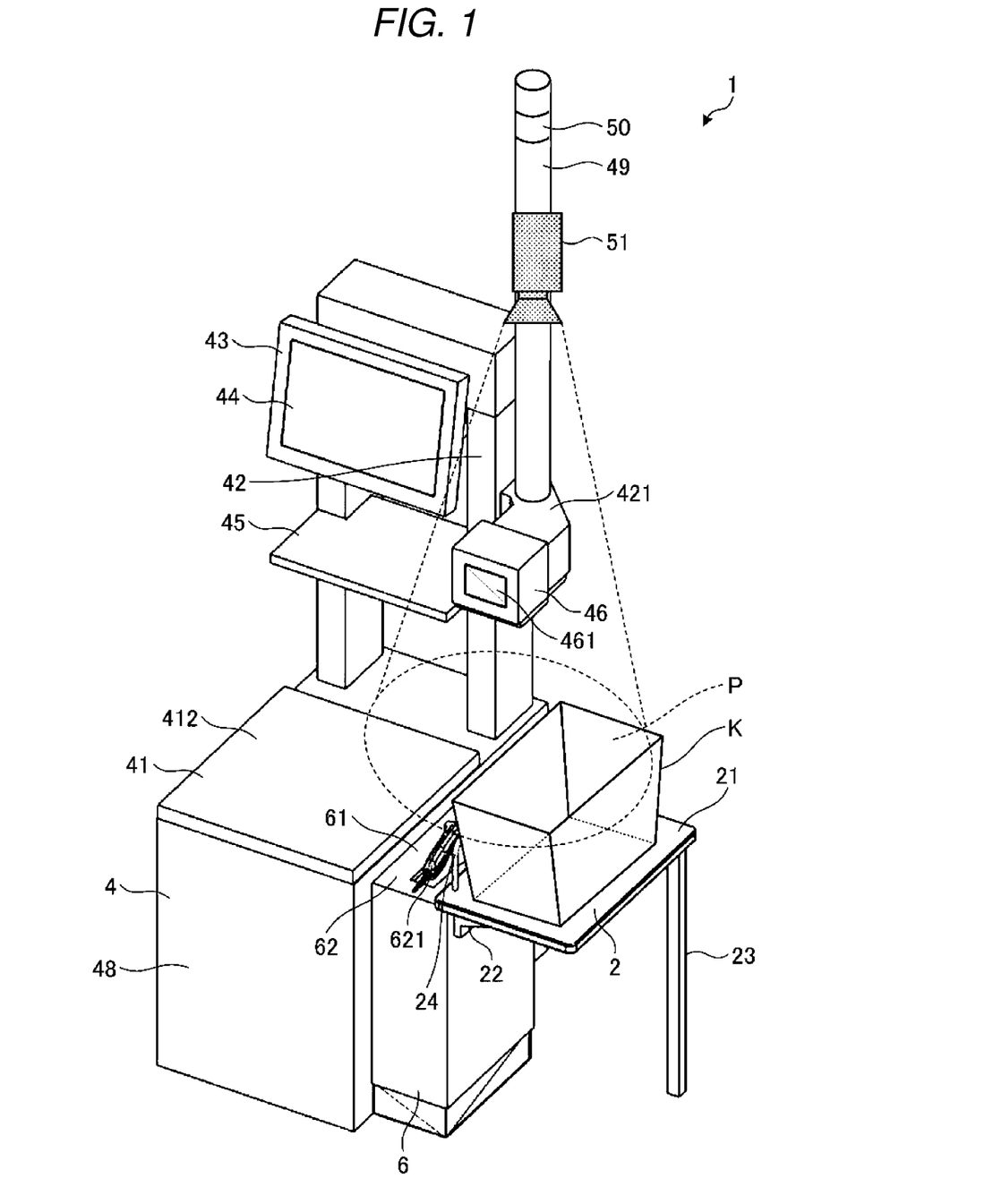
FIG. 1 is a perspective view showing a self-service commodity sales data processing device of an embodiment.
Figure 2:
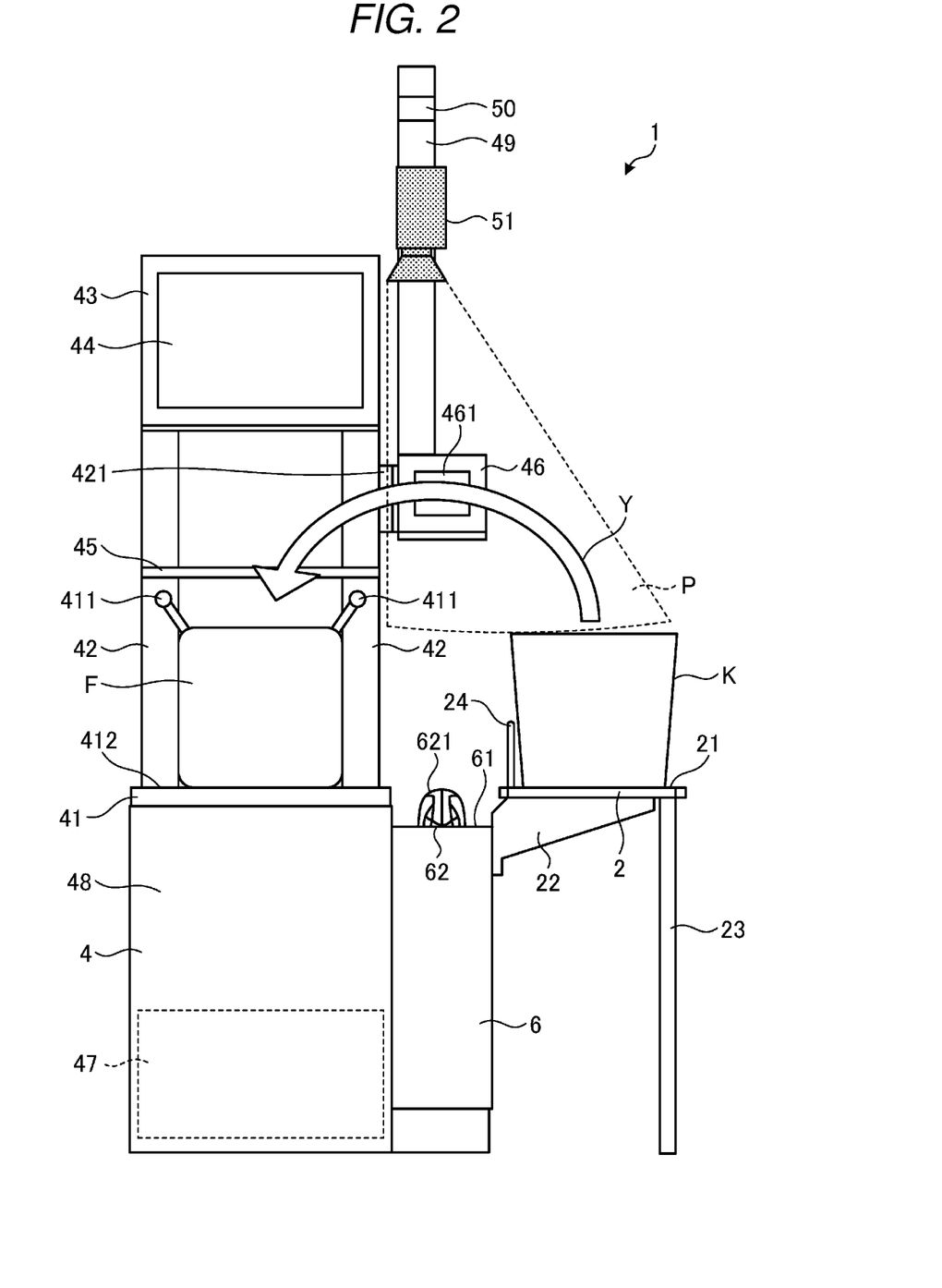
FIG. 2 is a front view showing the self-service commodity sales data processing device.

FIG. 1 is a perspective view showing a self-service POS terminal 1 of the embodiment. FIG. 2 is a front view showing the self-service POS terminal 1 of the embodiment.

As shown in FIGS. 1 and 2, the self-service POS terminal 1 of the embodiment includes a basket stand 2 (commodity placing unit), a commodity registration unit 4, and an article placing unit 6. The basket stand 2 is a stand on which a basket K containing commodities is placed. That is, the basket stand 2 is a stand on which commodities are indirectly placed. The basket stand 2 is attached to the article placing unit 6 by a mounting member 22. The basket stand 2 includes a foot portion 23 and supports the side opposite to the side attached to the article placing unit 6 of the basket stand 2. The basket stand 2 includes a basket placing surface 21 facing upward. The basket placing surface 21 is kept substantially horizontal by the foot portion 23. The basket placing surface 21 has a sufficient size for mounting the basket K.

The basket stand 2 is provided with a stopper 24, which is an example of the regulating portion, at the boundary portion with the article placing unit 6. The stopper 24 is formed by bending, for example, a rod-shaped metal into a substantially U-shape, and projects upward from the basket placing surface 21 at the substantially end portion on the article placing unit 6 side, and is attached in the direction perpendicular to the flow direction of the commodity described later.

The commodity registration unit 4 is installed close to the basket stand 2. The commodity registration unit 4 is a device that reads a symbol attached to a commodity taken out from the basket K and performs the commodity registration process and the settlement process. The commodity registration unit 4 includes a bag packing unit 41, a display unit 43, a scanner 46 (reading unit), and a control unit 300 described later. The scanner 46 is provided on the downstream side in the moving direction of the commodity from the basket stand 2. The bag packing unit 41 is provided on the downstream side in the moving direction of the commodity from the scanner 46.

Two support columns 42 are erected above from the upper part on the rear side of a housing unit 48. A temporary stand 45, the scanner 46, and the display unit 43 are attached to the support column 42 in this order from the bottom.

The scanner 46 is attached to the support column 42 by a support portion 421 protruding from the right side support column 42 to the right side (upstream side in the commodity flow direction). That is, the scanner 46 is provided on the right side (upstream side in the flow direction of the commodity) of the commodity registration unit 4. In other words, the commodity registration unit 4 is provided on the downstream side of the scanner 46 in the commodity flow direction.

The scanner 46 includes a reading window 461 for a customer who performs a symbol reading operation. The scanner 46 includes a built-in camera, and the symbol attached to the commodity passing in front of the reading window 461 is captured by the camera and read. Alternatively, the commodity registration unit 4 emits laser light and optically receives and reads the reflected light reflected by the symbol attached to the commodity passing in front of the reading window 461. In the embodiment, the scanner 46 captures and reads a symbol with a camera.

The display unit 43 is attached to the upper position of the support columns 42 (a position at a height that is easy for the customer to see) with the display surface facing the customer. The display unit 43 displays information to the customer who operates the self-service POS terminal 1. The control unit 300 analyzes the symbol read by the scanner 46 to acquire a commodity code that identifies the commodity, reads commodity information (commodity name, price, and the like) of the commodity specified by the commodity code, and displays the commodity information on the display unit 43. The display unit 43 is attached so that the angle can be adjusted in the left-right direction and the up-down direction with respect to the support columns 42 in order to direct the display unit 43 to an angle that is easy for the customer to see depending on the height of the customer or the like.

An operation unit 44 configured of, for example, a touch panel is provided on the display surface of the display unit 43. By operating the position of the operation unit 44 corresponding to the image of the key displayed on the display unit 43, the operation unit 44 serves as a keyboard on which the displayed key can be operated.

The bag packing unit 41 is an area for putting (packing) commodities in a bag F (shopping bag, my bag, or the like) set on extension bars 411 extending substantially horizontally from the support columns 42. The bag F is set on the extension bars 411 by the customer. The bottom surface of the bag F is in contact with the bag placing surface 412 in a state of being set on the extension bars 411. The customer puts the commodity whose symbol was read by the scanner 46 into the bag F so that the commodity is packed in the bag. The customer confirms that the information of the commodity whose symbol was read by the scanner 46 is displayed on the display unit 43, and then packs the commodity. The basket placing surface 21 of the basket stand 2 and the bag placing surface 412 of the bag packing unit 41 have substantially the same height.

The temporary stand 45 is a stand on which, among the commodities whose symbols were read by the scanner 46, fragile commodities and commodities whose shape is easily destroyed (tofu, egg, bread, assorted sashimi, and the like) are temporarily placed. Such commodities are finally packed in the upper part of the bag F after packing the other commodities in the bag.

Hereinafter, the article placing unit 6 will be described. The article placing unit 6 is provided adjacent to the commodity registration unit 4 on the upstream side in the flow direction of the commodity. As described above, since the basket stand 2 is attached to the article placing unit 6, the article placing unit 6 is interposed between the basket stand 2 and the commodity registration unit 4. Specifically, the article placing unit 6 is located between the basket stand 2 and the commodity registration unit 4 and is disposed adjacent to or in contact with the basket stand 2 and the commodity registration unit 4.

On an upper surface 61 of the article placing unit 6, a placing unit 62 on which an article related to the sales of commodities is placed is provided. In the embodiment, a handy type touch scanner 621 is an example of an article related to the sales of commodities. The touch scanner 621 has substantially the same function as the scanner 46 and reads a symbol attached to the commodity. In the embodiment, the touch scanner 621 has a configuration in which light emitted from a light emitting diode (LED) inside the touch scanners is reflected by the symbol and received by an image sensor disposed on the line to read the symbol. The placing unit 62 is a stand for the touch scanner 621.

The upper surface 61 of the article placing unit 6 is dented below the basket placing surface 21 of the basket stand 2 and the bag placing surface 412 of the bag packing unit 41. However, by providing the article placing unit 62 on the upper surface 61 of the article placing unit 6, the article placing unit 6 is formed in an upward convex shape. Specifically, the article placing unit 6 has a curved surface (that is, a non-planar shape) that is convex upward by the mounted touch scanner 621 by placing the touch scanner 621 on the placing unit 62 on the upper surface 61. The article placing unit 6 on which the touch scanner 621 is placed on the placing unit 62 is in a convex state protruding upward from the basket placing surface 21 of the basket stand 2 and the bag placing surface 412 of the bag packing unit 41.

The placing unit 62 is located substantially directly below the scanner 46 in the commodity flow direction (width direction of the self-service POS terminal 1) indicated by the arrow Y. In the embodiment, as shown in FIG. 1, the placing unit 62 is not located substantially directly below the scanner 46 in the depth direction of the self-service POS terminal 1. That is, the placing unit 62 is located on the front side (customer side) of the scanner 46 in the depth direction of the self-service POS terminal 1.

The upper surface of the support portion 421 is provided with a substantially columnar pole 49 extending upward. A patrol lamp 50 is provided at the upper tip of the pole 49. The patrol lamp 50 is a lamp for notifying the attendant, for example, if an error occurs in the self-service POS terminal 1 (particularly the commodity registration unit 4) or if the receipt paper runs out and emits light in red, orange, and the like depending on the type and status of the error. The patrol lamp 50 normally emits blue light or is turned off.

Further, a camera 51 is provided at a substantially central portion in the vertical direction of the pole 49. The camera 51 is a camera capable of capturing a moving image. The camera 51 is installed facing downward. The camera 51 takes an image from above to below. The camera 51 captures the operation of taking out the commodity from the basket K, the commodity taken out, the operation of moving the commodity taken out from the basket K to a position substantially in front of the scanner 46 in the direction indicated by the arrow Y, and the moving commodity as a moving image. The camera 51 may capture the operation of taking out the commodity from the basket K, the taken-out commodity, the operation of moving the commodity to a position substantially in front of the scanner 46, and the moving commodity as a plurality of continuous snapshots.

In the embodiment of such a configuration, the customer places the basket K containing the commodity to be purchased on the basket placing surface 21 of the basket stand 2. Since the basket stand 2 is provided with the stopper 24, the basket K does not come out to the placing unit 62 side if the basket K is placed on the basket placing surface 21 of the basket stand 2, or the basket K does not move to the placing unit 62 side if the commodity is taken out from the basket K. Therefore, the commodity in the basket K is not located directly under the scanner 46 (that is, the stopper 24 regulates the commodity in the basket K from coming out or moving toward the scanner 46). Thus, the scanner 46 does not mistakenly read the commodity in the basket K.

If the customer operates a start key (not shown), the self-service POS terminal 1 starts a transaction of the commodity with the customer. The customer takes out the commodity from the basket K and directs the symbol attached to the commodity toward the scanner 46 while moving the commodity in the direction of the arrow Y (the moving direction of the commodity). The camera 51 takes an image of this operation and the taken-out commodity. The scanner 46 reads the directed symbol. After that, the customer moves the commodity whose symbol was read in the direction of the arrow Y and puts the commodity in the bag F. By performing the operation for all the commodities in the basket K, the customer performs the commodity registration operation. The self-service POS terminal 1 executes the commodity registration process and the settlement process for the commodity for which the customer performed the commodity registration operation.

If the commodity read by the scanner 46 is a commodity whose shape is easily destroyed, the customer temporarily places the commodity on the temporary stand 45. Then, after reading the symbols of all the commodities, the commodities placed on the temporary stand 45 are finally packed in the bag.

Figure 3:
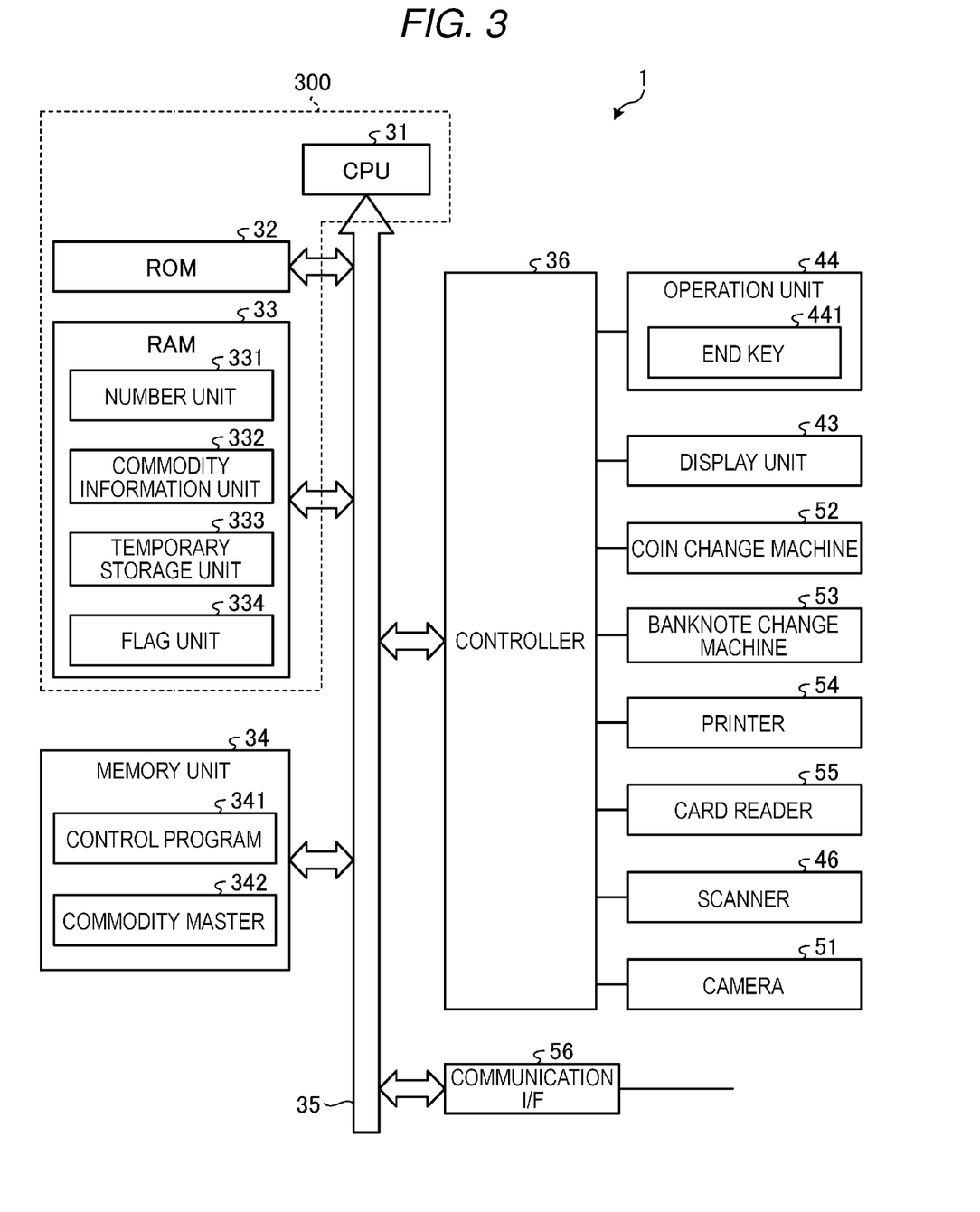
FIG. 3 is a block diagram showing a hardware configuration of the self-service commodity sales data processing device.

The commodity registration process refers to a process of acquiring a commodity code that identifies the commodity based on the symbol read by the scanner 46, reading commodity information (commodity name, commodity price, and the like) related to the commodity from a commodity master 342 (see FIG. 3) described later based on the acquired commodity code, displaying the commodity information on the display unit 43, and storing the commodity information in a commodity information unit 332 (see FIG. 3).

The settlement process refers to a process of making a settlement related to the transaction using the designated media based on the commodity information stored in the commodity information unit 332. The settlement process includes the dispensing of a receipt printed with the total amount and commodity information. If the settlement process is completed, the transaction with one customer is completed.

Hereinafter, the hardware of the self-service POS terminal 1 according to the embodiment will be described. FIG. 3 is a block diagram showing a hardware configuration of the self-service POS terminal 1. As shown in FIG. 3, the self-service POS terminal 1 includes a central processing unit (CPU) 31, a read only memory (ROM) 32, a random access memory (RAM) 33, a memory unit 34, and the like. The CPU 31 is a main body for control. The ROM 32 stores various programs. The RAM 33 loads programs and various data. The memory unit 34 stores various programs. The CPU 31, ROM 32, RAM 33, and memory unit 34 are connected to each other via a bus 35. The CPU 31, ROM 32, and RAM 33 constitute the control unit 300. That is, the control unit 300 executes the control process of the self-service POS terminal 1 described later by operating the CPU 31 according to the control program stored in the ROM 32 or the memory unit 34 and loaded in the RAM 33.

The RAM 33 includes a number unit 331, the commodity information unit 332, a temporary storage unit 333, and a flag unit 334. The number unit 331 stores the number of commodities taken out from the basket K at one time. The commodity information unit 332 stores the commodity information of the commodity for which the commodity registration process was performed. If a plurality of commodities taken out from the basket K at one time are read by the scanner 46, the temporary storage unit 333 temporarily stores the commodity information (commodity code) of the commodities. The flag unit 334 stores the flag "1" if the commodities taken out from the basket K at one time are different commodities. The flag unit 334 does not store the flag "1" (remains the flag "0") if the commodities taken out from the basket K at one time are identical commodities.

The memory unit 34 is configured of a hard disc drive (HDD), a flash memory, or the like, and maintains the stored contents even if the power is cut off. The memory unit 34 includes a control program unit 341 and the commodity master 342. The control program unit 341 stores a control program for controlling the self-service POS terminal 1. The commodity master 342 stores commodity information such as the commodity name and the price of the commodity in association with the commodity code that identifies the commodity for each commodity.

The control unit 300 connects the operation unit 44, the display unit 43, a coin change machine 52, a banknote change machine 53, a printer 54, a card reader 55, the scanner 46, and the camera 51 via the bus 35 and a controller 36. The display unit 43 displays information such as commodity information and settlement information to the customer who operates the self-service POS terminal 1. The operation unit 44 is a keyboard provided on the display unit 43, operated by a customer, and composed of touch keys including an end key 441. The end key 441 is operated by the customer if the commodity data process for all the commodities to be purchased is completed and the customer's operation by the self-service POS terminal 1 is completed. The coin change machine 52 stores coins among the money received from the customer and pays out the change for the coins. The banknote change machine 53 stores banknotes among the money received from the customer and pays out the change for the banknotes. The printer 54 dispenses a receipt printed with commodity information, settlement information, and the like. The card reader 55 reads card information of a card such as a credit card. The scanner 46 reads the symbol attached to the commodity. The camera 51 takes an image of the commodity taken out from the basket K by the customer.

The control unit 300 is connected to a communication interface (I/F) 56 via the bus 35. The communication interface 56 is connected to a store server (not shown), which is a higher-level device of the self-service POS terminal 1, so that information can be transmitted and received.

Figure 4:
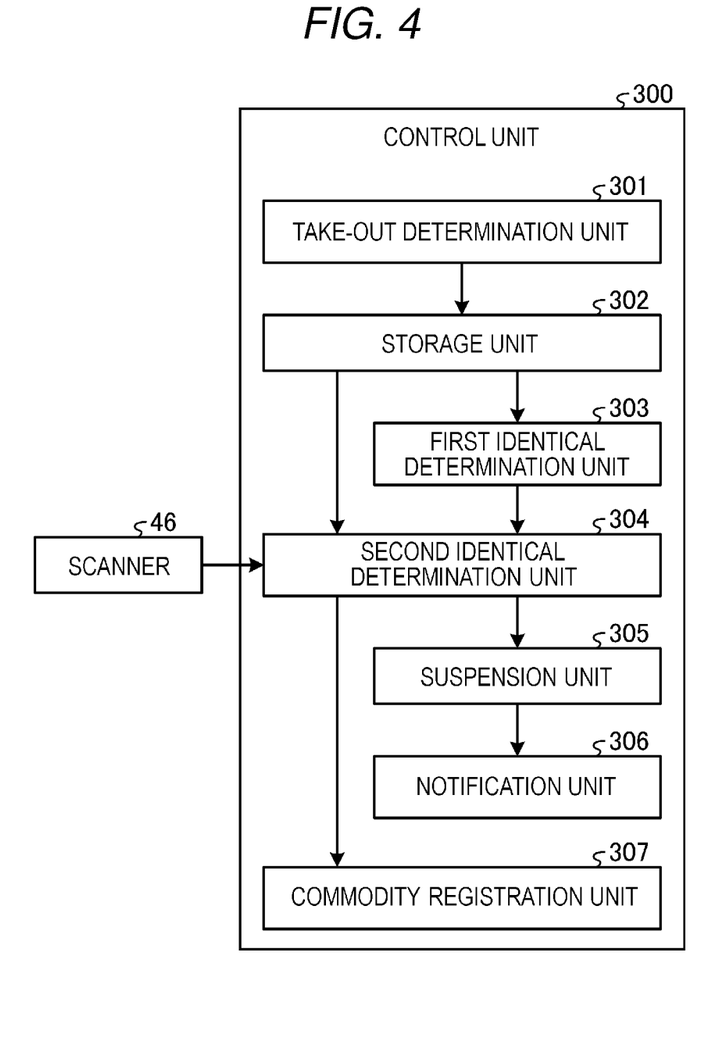
FIG. 4 is a functional block diagram showing a functional configuration of the self-service commodity sales data processing device.

Hereinafter, the functional configuration of the self-service POS terminal 1 according to the embodiment will be described. FIG. 4 is a functional block diagram showing a functional configuration of the self-service POS terminal 1. As shown in FIG. 4, the control unit 300 of the self-service POS terminal 1 functions, by following the control program stored in the control program unit 341 and loaded in the RAM 33, as a take-out determination unit 301, a storage unit 302, a first identical determination unit 303, a second identical determination unit 304, a suspension unit 305, a notification unit 306, and a commodity registration unit 307. The take-out determination unit 301 determines whether a plurality of (for example, two) commodities were taken out at the same time based on the images of the commodities taken out from the basket stand 2. Specifically, the take-out determination unit 301 uses, for example, a method of detecting contours of the commodity by using a known edge detection technique to determine whether a plurality of commodities were taken out at the same time, based on an image captured by the camera 51 input from the camera 51 that captures the commodity taken out from the basket stand 2. More specifically, the take-out determination unit 301 first detects the hand of the customer who took out the commodity from the basket K and determines whether a plurality of commodities were taken out at the same time by using the above method for the commodity held in the hand.

The storage unit 302 stores the number of commodities (for example, two) that the take-out determination unit 301 determines that a plurality of commodities were taken out at the same time. Specifically, the storage unit 302 stores the number of commodities in the number unit 331 if the take-out determination unit 301 determines that a plurality of commodities were taken out at the same time.

The first identical determination unit 303 determines whether the commodities determined to be plural by the take-out determination unit 301 are different commodities or identical commodities. Specifically, the first identical determination unit 303 determines whether the commodities determined to be plural (for example, two) by the take-out determination unit 301 are different commodities or identical commodities based on, for example, whether the colors, textures and the like of a plurality of commodities are the same or different, using a known general recognition technique.

If the first identical determination unit 303 determines that the commodities are different commodities (for example, two different commodities), the second identical determination unit 304 determines whether the read commodities are the identical commodity based on the information of the commodity read by the scanner 46. Specifically, the second identical determination unit 304 determines whether the commodities are identical commodities if the commodities, the number of which (for example, two) is stored by the storage unit 302, are read by the scanner 46. For example, if the storage unit 302 stores "2", the second identical determination unit 304 determines that two commodities are identical if the two commodities read by the scanner 46 are the same. For example, if the storage unit 302 stores "3", the second identical determination unit 304 determines that the three commodities are all the same if the three commodities read by the scanner are all the same.

The suspension unit 305 suspends the transaction if the second identical determination unit 304 determines that the commodities are identical commodities.

The notification unit 306 notifies an alert if the suspension unit 305 suspended the transaction. Specifically, the notification unit 306 notifies the attendant or the like of an alert by, for example, causing the patrol lamp 50 to emit light in red or orange. The notification unit 306 notifies, for example, the attendant or the like of the alert by transmitting the alert information to the attendant PC monitored by the attendant so that the alert information is displayed thereon.

If the second identical determination unit 304 determines that the commodities are different commodities, the commodity registration unit 307 executes the commodity registration process of the plurality of commodities. Specifically, if the second identical determination unit 304 determines that the commodities are different commodities, the commodity registration unit 307 executes the commodity registration process of a plurality of (for example, two) commodities based on the commodity code stored in the temporary storage unit 333.

Figure 5:
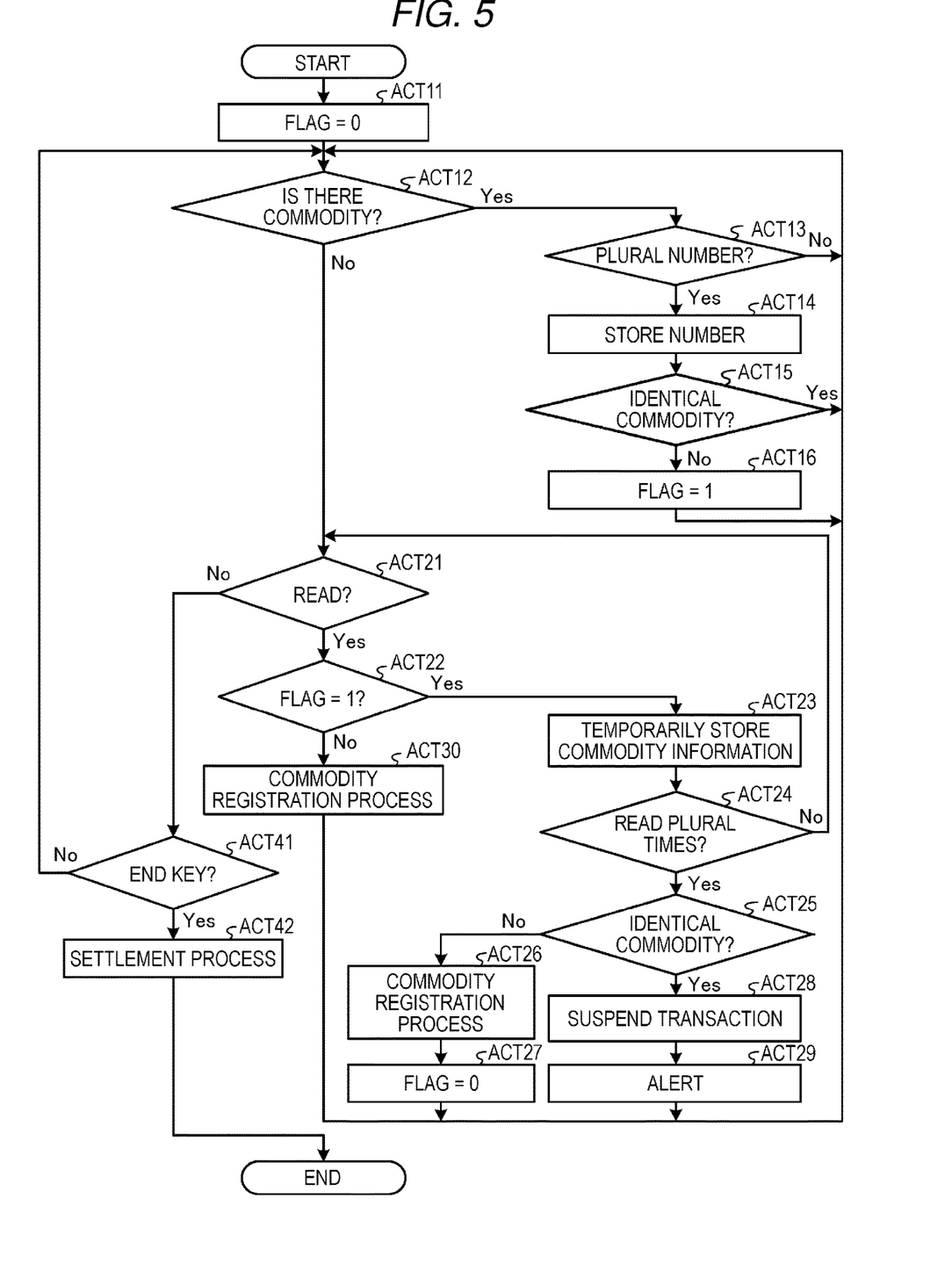
FIG. 5 is a flowchart showing a control flow of the self-service commodity sales data processing device.

Hereinafter, the control of the self-service POS terminal 1 will be described. FIG. 5 is a flowchart showing a control flow of the self-service POS terminal 1. As shown in FIG. 5, the control unit 300 of the self-service POS terminal 1 stores the flag "0" in the flag unit 334 as an initial setting (ACT 11). Next, the control unit 300 determines whether the commodity was taken out from the basket K based on the image captured by the camera 51 (ACT 12). For example, if an object other than the hand is present in the image captured by the camera 51, it is determined that the commodity was picked up from the basket K. If it is determined that the commodity was picked up from the basket K (Yes in ACT 12), then the take-out determination unit 301 determines whether a plurality of commodities were taken out at the same time based on the image of the camera 51 that captures the commodity taken out from the basket K (ACT 13). If it is determined that a plurality of commodities were taken out at the same time (Yes in ACT 13), the storage unit 302 stores the number of commodities taken out at the same time in the number unit 331 (ACT 14).

Next, the first identical determination unit 303 determines whether a plurality of commodities whose number is stored in the number unit 331 are different commodities or identical commodities (ACT 15). If it is determined that a plurality of commodities whose number is stored in the number unit 331 are different commodities (No in ACT 15), the control unit 300 rewrites the flag "0" stored in the flag unit 334 to the flag "1" (ACT 16). Then, the control unit 300 returns to ACT 12.

If it is determined in ACT 13 that a plurality of commodities were not taken out at the same time (No in ACT 13), the control unit 300 returns to ACT 12. In ACT 15, if it is determined that the plurality of commodities whose number is stored in the number unit 331 are identical commodities (Yes in ACT 15), the control unit 300 returns to ACT 12.

In ACT 12, if it is determined that no commodity was taken out from the basket K (No in ACT 12), the control unit 300 determines whether the symbol was read by the scanner 46 (ACT 21). If it is determined that the symbol was read (Yes in ACT 21), the control unit 300 determines whether the flag "1" is stored in the flag unit 334 (ACT 22). If it is determined that the flag "1" is not stored in the flag unit 334 (No in ACT 22), the control unit 300 executes the commodity registration process related to the corresponding commodity based on the commodity code acquired by analyzing the read symbol (ACT 30). Then, the control unit 300 returns to ACT 12.

In ACT 22, if it is determined that the flag "1" is stored in the flag unit 334 (Yes in ACT 22), the acquired commodity code is stored in the temporary storage unit 333 (ACT 23).

Next, the control unit 300 determines whether the symbols were read by the scanner 46 for the number of times stored in the number unit 331 (ACT 24). If it is determined that the symbols were not read for the number of times stored in the number unit 331 (No in ACT 24), the control unit 300 returns to ACT 21 and waits for the next symbol to be read.

If it is determined that the scanner 46 read the symbols for the number of times stored in the number unit 331 (Yes in ACT 24), then the second identical determination unit 304 determines whether the commodities read by the scanner 46 are the identical commodity based on the commodity information read by the scanner 46 (ACT 25). If it is determined that the commodities are not identical commodities (No in ACT 25), the commodity registration unit 307 executes the commodity registration process of the commodity based on the commodity code stored in the temporary storage unit 333 (ACT 26). Then, the control unit 300 changes the flag "1" stored in the flag unit 334 to the flag "0". Then, the control unit 300 returns to ACT 12.

In ACT 25, if it is determined that the commodities are identical commodities based on the commodity information read by the scanner 46 (Yes in ACT 25), the suspension unit 305 suspends the transaction of the customer (ACT 28). That is, the control unit 300 stops all subsequent processes for the customer to stop the transaction for the customer. Then, the notification unit 306 notifies the attendant or the like of an alert indicating that the suspension unit 305 suspended the transaction (ACT 29). Then, the control unit 300 returns to ACT 12.

That is, the control unit 300 determines that the commodities taken out at one time are not the identical commodity in ACT 15 but determines that the commodities whose symbols were read are the identical commodity in ACT 25, so that the customer's transaction is suspended since there is the possibility that the customer may have cheated.

If the attendant or the like is notified of the alert, he or she goes to the self-service POS terminal 1 issuing the alert and checks whether there is a fraudulent act by the customer.

In ACT 21, if it is determined that the symbol is not read (No in ACT 21), the control unit 300 determines whether the end key 441 was operated (ACT 41). If it is determined that the end key 441 was operated (Yes in ACT 41), the control unit 300 executes the settlement process for the customer based on the commodity information stored in the commodity information unit 332 (ACT 42). Then, the control unit 300 ends the transaction with the customer. If it is determined that the operation is not the operation by the end key 441 (No in ACT 41), the control unit 300 returns to ACT 12.

As described above, the self-service POS terminal 1 of the embodiment is a self-service POS terminal 1 in which the customer themselves operates to perform a transaction of a commodity to be purchased, and includes the take-out determination unit 301 for determining whether a plurality of commodities were taken out at the same time based on the image of the commodity taken out from the basket K placed on the basket stand 2, the first identical determination unit 303 for determining whether a plurality of taken-out commodities are different commodities or identical commodities if the take-out determination unit 301 determines that the plurality of commodities were taken out at the same time, the scanner 46 for reading the information of the taken-out commodities, the second identical determination unit 304 for determining whether the plurality of taken-out commodities read by the scanner 46 are the identical commodity if the first identical determination unit 303 determines that the commodities are different commodities, and the suspension unit 305 for suspending the transaction if the second identical determination unit 304 determines that the commodities are the identical commodity.

According to such a self-service POS terminal 1 of the embodiment, if a plurality of commodities taken out from the basket Kat one time are different commodities, the transaction is suspended if the commodities read by the scanner 46 are the identical commodity. Therefore, such a self-service POS terminal 1 of the embodiment can prevent fraudulent acts related to commodity registration by customers.

While certain embodiments have been described, the embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the embodiment, the camera 51 was described as a configuration element of the self-service POS terminal 1. However, the present disclosure is not limited thereto, and the camera 51 does not have to be the configuration element of the self-service POS terminal 1. Here, the image captured by the camera 51 installed in the vicinity of the self-service POS terminal 1 is input to the self-service POS terminal 1. The take-out determination unit 301 determines whether a plurality of commodities were taken out at the same time based on the image input from the camera 51 installed in the vicinity of the self-service POS terminal 1.

The program executed by the self-service POS terminal 1 of the embodiment is provided by recording the program on a computer-readable recording medium, such as a CD-ROM, a flexible disk (FD), a CD-R, or a digital versatile disk (DVD) as a file in an installable format or an executable format.

The program executed by the self-service POS terminal 1 of the embodiment may be stored on a computer connected to a network such as the Internet and provided by downloading via the network. The program executed by the self-service POS terminal 1 of the embodiment may be configured to be provided or distributed via a network such as the Internet.

The program executed by the self-service POS terminal 1 of the embodiment may be configured to be provided by incorporating the program in a ROM or the like in advance.

What is claimed is:
1. A self-service commodity sales data processing device, comprising:
   a processor coupled to a memory that stores machine readable instructions, which when executed by the processor cause the processor to perform operations comprising:

determining, during a transaction, that a plurality of commodities are taken out simultaneously based on an image of a commodity taken out from a commodity placing location;

determining, based on an image recognition technique, that the plurality of commodities taken out simultaneously comprise different commodities;

storing a quantity of the plurality of commodities taken out simultaneously;

reading information of each of the plurality of commodities taken out simultaneously;

determining that the information of each of the plurality of commodities taken out simultaneously is identical for every commodity of the quantity; and based on the determination that the plurality of taken out commodities comprise different commodities, and the determination that the information of each of the plurality of commodities is identical for every commodity of the quantity, suspending the transaction, wherein suspending the transaction prevents the transaction from being a fraudulent transaction.

2. The self-service commodity sales data processing device according to claim 1, further comprising: executing a commodity registration process for the different commodities.

3. The self-service commodity sales data processing device according to claim 1, wherein the image recognition technique comprises a general recognition technique.

4. The self-service commodity sales data processing device according to claim 1, wherein the operations further comprise: notifying an alert based on suspending the transaction.

5. The self-service commodity sales data processing device according to claim 1, wherein the self-service commodity sales data processing device further comprises a camera.

6. The self-service commodity sales data processing device according to claim 1, wherein the self-service commodity sales data processing device further comprises a scanner.

7. A method performed by a self-service commodity sales data processing device, comprising:

determining, during a transaction, that a plurality of commodities are taken out simultaneously based on an image of a commodity taken out from a commodity placing location;

determining, based on an image recognition technique, that the plurality of commodities taken out simultaneously comprise different commodities;

storing a quantity of the plurality of commodities taken out simultaneously;

reading information of each of the plurality of commodities taken out simultaneously;

determining that the information of each of the plurality of commodities taken out simultaneously is identical for every commodity of the quantity; and based on the determination that the plurality of taken out commodities comprise different commodities, and the determination that the information of each of the plurality of commodities is identical for every commodity of the quantity, suspending the transaction, wherein suspending the transaction prevents the transaction from being a fraudulent transaction.

8. The method according to claim 7, further comprising: executing a commodity registration process of the plurality of commodities if it is determined that the commodities are different commodities.

9. The method according to claim 7, wherein the image recognition technique comprises a general recognition technique.

10. The method according to claim 7, further comprising: notifying an alert based on suspending the transaction.

11. A self-service point of sale terminal, comprising
at least one processor coupled to at least a memory that stores machine readable instructions, which when executed by the processor cause the processor to perform operations comprising:

determining, during a transaction, that a plurality of commodities are taken out simultaneously based on an image of a commodity taken out from a commodity placing location;

determining, based on an image recognition technique, that the plurality of commodities taken out simultaneously comprise different commodities;

storing a quantity of the plurality of commodities taken out simultaneously;

reading information of each of the plurality of commodities taken out simultaneously;

determining that the information of each of the plurality of commodities taken out simultaneously is identical for every commodity of the quantity; and based on the determination that the plurality of taken out commodities comprise different commodities, and the determination that the information of each of the plurality of commodities is identical for every commodity of the quantity, suspending the transaction, wherein suspending the transaction prevents the transaction from being a fraudulent transaction.

12. The self-service point of sale terminal according to claim 11, further comprising: executing by the self-service point sales terminal, a commodity registration process for the different commodities.

13. The self-service point of sale terminal according to claim 11, wherein the image recognition technique comprises a general recognition technique.

14. The self-service point of sale terminal according to claim 11, wherein the operations comprise: notifying, by the self-service point of sale terminal, an alert based on suspending the transaction.

15. The self-service point of sale terminal according to claim 11, wherein the self-service point of sale terminal further comprises a camera.

16. The self-service point of sale terminal according to claim 11, wherein the self-service point of sale terminal further comprises a scanner.

* * * * *